No. 893,664. PATENTED JULY 21, 1908.
W. SHAKESPEARE, Jr.
FISH BAIT OR LURE.
APPLICATION FILED OCT. 23, 1905.

Witnesses:
Ethel A. Bradford
Amelia J. Alber

Inventor,
William Shakespeare Jr
By Chappell & Earl
Att'ys

UNITED STATES PATENT OFFICE.

WILLIAM SHAKESPEARE, JR., OF KALAMAZOO, MICHIGAN.

FISH BAIT OR LURE.

No. 893,664.

Specification of Letters Patent.

Patented July 21, 1908.

Application filed October 23, 1905. Serial No. 284,017.

*To all whom it may concern:*

Be it known that I, WILLIAM SHAKESPEARE, Jr., a citizen of the United States, residing at Kalamazoo, in the county of Kalamazoo and State of Michigan, have invented certain new and useful Improvements in Fish Baits or Lures, of which the following is a specification.

This invention relates to improvements in fish baits or lures.

The main object of this invention is to provide an improved fish bait or lure in which the hooks are held so that they cannot become entangled with each other or mar the body of the bait.

A further object is to provide an improved means for securing the hooks to the body.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing forming a part of this specification, in which—

Figure 1:
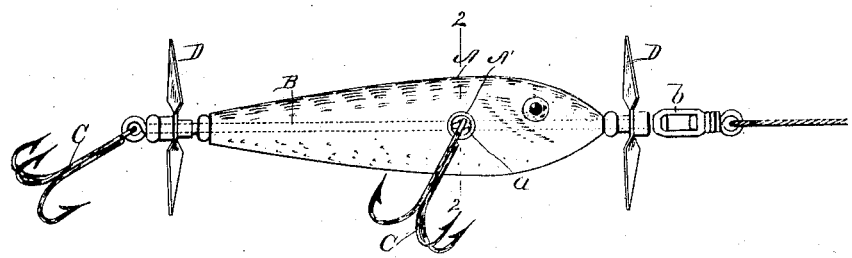
Figure 2:
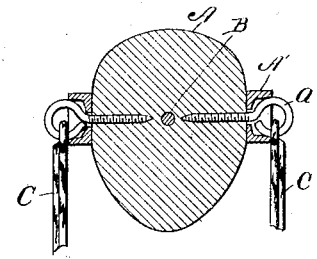

Figure 1 is a side elevation of my improved fish bait or lure. Fig. 2 is an enlarged detail cross-section, taken on a line corresponding to line 2 2 of Fig. 1, the screw eyes and hooks being shown in full lines.

In the drawing similar letters of reference refer to similar parts in both views.

Referring to the drawing, the body portion A of my improved bait or lure is preferably shaped like a minnow, and is suitably painted or decorated as desired. Arranged through the body A is a rod B having a swivel, as *b*, on its forward end, and a hook, as C' at its rear end. The line is connected to the swivel *b*. This rod B serves as a support for the spinners D.

The hooks C, which are attached directly to the body A, are preferably secured by means of the screw eyes *a*, the eyes of the screws engaging the eyes of the hooks. These screw eyes *a* are provided with socket-like washers A'. These washers are adapted to receive a portion of the heads of the screw eyes, so that the heads are held out from the body; and, owing to the sockets embracing the heads of the screw eyes, the hooks are held so that they cannot swing inwardly toward the body to engage each other under or over the same, or to engage the body and mar or abrade the same.

The sockets A' are preferably of bright metal, such as polished brass, or nickel plated, so that they serve to attract the attention of the fish and in a measure direct its strike at the bait, causing the fish to strike the bait in a manner to secure the most effective hooking. The washer-like sockets A' protect the body so that it is not likely to become injured by adjusting the screw eyes therein.

The body is so protected that its finish is not likely to be broken, either in attaching the hooks or by the hooks themselves in use, so that the bait maintains its attractive appearance and is thoroughly protected by the paint, thereby reducing its liability to become watersoaked.

While I prefer to use the screw eyes *a* for securing the hooks C on account of their economy and convenience in adjustment, I am aware that other means might be employed for this purpose and desirable results still be secured.

The parts of my improved bait are very economical to produce and assemble. The hooks may be readily attached or detached, and the structure is, as before remarked, very durable in use.

Having thus described my invention, what I claim as new and desire to secure by Letters Patent, is:

In a bait or lure, the combination of a body portion; a hook; a screw-eye for securing said hook to said body; and a socket-like washer for said screw-eye secured to said body thereby, adapted to receive a portion of the head of said screw-eye whereby the hook is prevented from contacting with the body.

In witness whereof, I have hereunto set my hand and seal in the presence of two witnesses.

WILLIAM SHAKESPEARE, JR. [L. S.]

Witnesses:
ETHEL A. BRADFORD,
OTIS A. EARL.